(12) United States Patent
Davan et al.

(10) Patent No.: US 8,340,408 B2
(45) Date of Patent: Dec. 25, 2012

(54) AUTOMATIC PAGE LAYOUT VALIDATION

(75) Inventors: Patrice Davan, Echirolles Cedex (FR); Sassda Chap, Echirolles Cedex (FR)

(73) Assignee: Yahoo! Inc., Sunnyvale, CA (US)

(*) Notice: Subject to any disclaimer, the term of this patent is extended or adjusted under 35 U.S.C. 154(b) by 973 days.

(21) Appl. No.: 12/395,167

(22) Filed: Feb. 27, 2009

(65) Prior Publication Data
US 2010/0220923 A1    Sep. 2, 2010

(51) Int. Cl.
*G06K 9/00*    (2006.01)
(52) U.S. Cl. ....................................................... 382/162
(58) Field of Classification Search ................... 382/162, 382/164, 167, 274, 309; 358/1.12, 1.15, 358/1.18, 518; 714/744; 705/14.4
See application file for complete search history.

(56) References Cited

U.S. PATENT DOCUMENTS

| | | | |
|---|---|---|---|
| 6,385,350 B1* | 5/2002 | Nicholson et al. | 382/309 |
| 7,962,363 B2* | 6/2011 | Patel et al. | 705/14.4 |
| 2003/0007167 A1* | 1/2003 | Catt et al. | 358/1.12 |
| 2004/0030741 A1* | 2/2004 | Wolton et al. | 709/202 |

* cited by examiner

*Primary Examiner* — Duy M Dang
(74) *Attorney, Agent, or Firm* — Hickman Palermo Truong Becker Bingham Wong LLP

(57) ABSTRACT

A method for validating the layout of webpages comprises receiving a webpage, transforming the webpage into a color-coded page, and determining based at least in part on detecting a color on the color-coded page that a layout of the webpage contains an error. The transforming can comprise identifying a block of content in the webpage, identifying a size and a location of the block, creating a new block with the size and the location of the block, and assigning a new color to the new block. The determining can comprise storing an image snapshot of the color-coded page and comparing the image snapshot to a reference image.

18 Claims, 6 Drawing Sheets

AUTOMATIC PAGE LAYOUT VALIDATION

FIELD OF THE INVENTION

Aspects of the present invention relate generally to the field of webpage development, and more particularly to an improved method and system for validating the correctness of webpage layouts.

BACKGROUND OF THE INVENTION

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

Modern webpages are frequently designed using templates, commonly referred to as wireframes, that supply the layout of elements for a series of pages in a particular domain. Wireframes are often completed before content is developed, and once completed, can provide a visual reference upon which to structure each page. Benefits of developing websites using wireframes include allowing for variations of webpages throughout a site to have a consistent layout as well as eliminating the need for redeveloping redundant portions of webpages. For example, YAHOO® might develop a wireframe for its real estate sections so that the real estate home pages for Yahoo.com, uk.Yahoo.com, fr.Yahoo.com, and all of YAHOO's® other real estate home pages have the same layout. FIG. 1 is an example of a layout that a wireframe might implement. The layout might generally include a header block 101, a property searching block 102, a mortgage information block 103, an advertisement block 104, a news feed block 105, various blocks 106 and 107, and a footer block 108.

Web developers for each of the real estate home pages can then add unique content to each block in wireframes. For example, a web developer for Yahoo.com can add English titles to the header block 101, while the developer for fr.Yahoo.com might add French titles to the header block 101. A web developer for uk.yahoo.com might add a property search module configured to search a database of United Kingdom property listings to the property search block 102 while a web developer for Yahoo.com adds a property search module configured to search a database of United States listings, and so on.

After adding the content, web developers can utilize tools to validate the content of the page to determine if the coding such as the hypertext markup language (HTML) or extensible markup language (XML) markup is correct, but such tools do not validate that the layout of the page will be correct when the webpage is rendered by an internet browser such as Internet Explorer®, Firefox®, or Safari®. For example, if a news feed module added to the news feed block 105 is too large, it might cause the news feed block 105 to overlap with the mortgage information block 103 when the page is rendered by an internet browser. Mistakes to a page's layout can occur under many different circumstances, but common situations include site redesigning and site localizing. For example, when redesigning a site a new module might replace an older module in a particular block, and the new module might cause a block to expand and overlap with another block. Additionally, when localizing sites, translations can cause blocks to expand. For example, a block containing a date might be configured for an English language format that has a maximum number of characters, but when translated into a date format of a different language, that maximum number of characters might be exceeded causing the block to expand and overlap with another block.

Currently, validating the layout of a webpage is done manually which can be both difficult and time consuming. Additionally, mistakes in layout might not be readily identifiable to the human eye because the boundaries of different blocks might not be discernible and only under certain circumstance will the overlapping of blocks cause overlapping of content. Unlike the example of FIG. 1 which shows clear borders for each block, in many webpages, the borders of the different blocks are not shown, and each block might have the same background color, making the borders of blocks indistinguishable.

For example, the news feed block 105 and mortgage information block 103 might have a common background color such that the boundaries of the blocks are not identifiable to the human eye. Additionally, the newsfeed block 105 might be configured to display a date that has a maximum number of characters. When implementing the wireframe into a German language site, however, the date might sometimes, for example only on particular days or in a particular month, exceed the maximum number of characters causing the content of the newsfeed block 105 to overlap with the content of the mortgage information block 103 when rendered by an internet browser.

Based on the foregoing, there exists a need for an improved means of validating a webpage's layout.

BRIEF DESCRIPTION OF THE DRAWINGS

The present invention is illustrated by way of example, and not by way of limitation, in the figures of the accompanying drawings.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Figure 1:
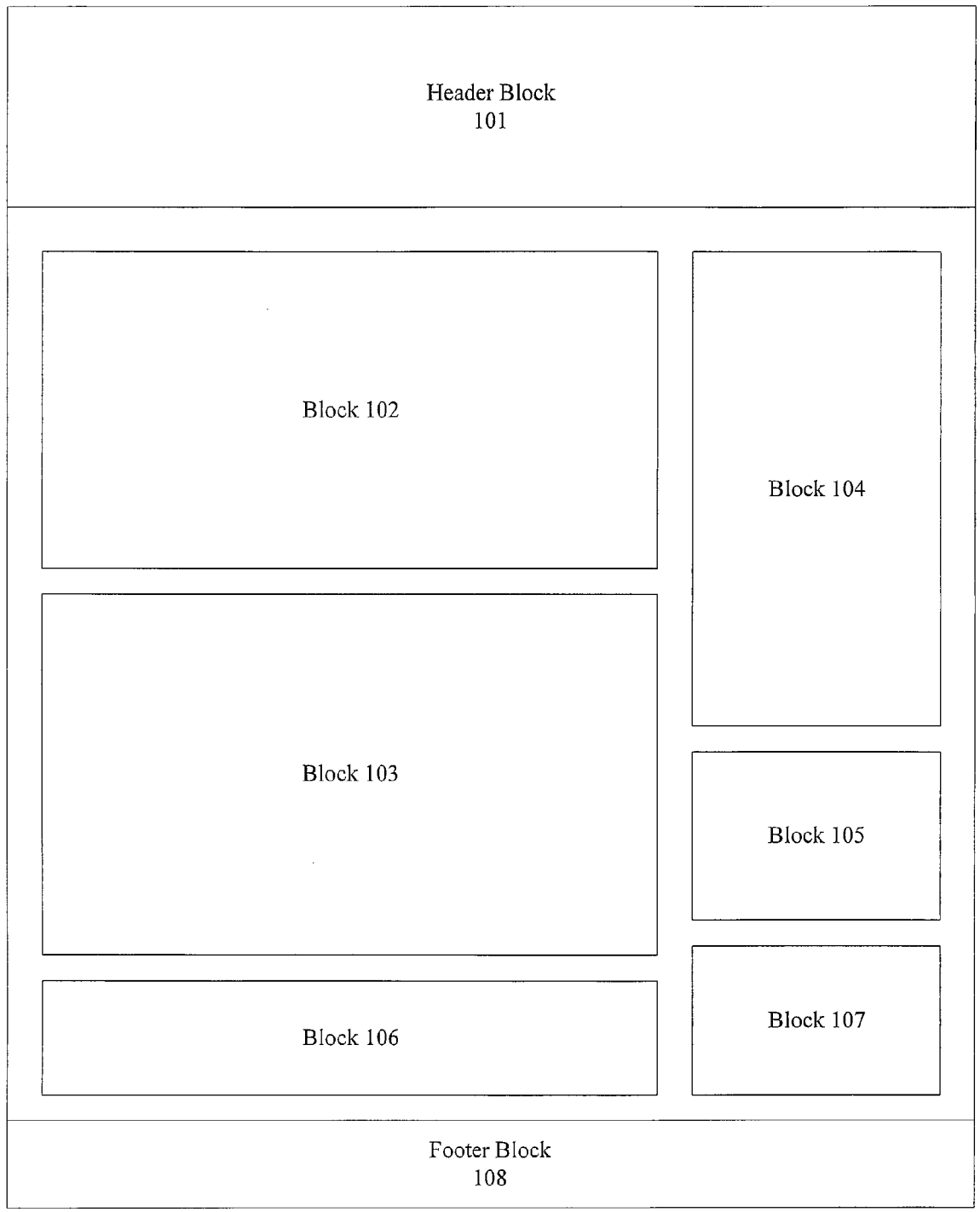
FIG. 1 shows an example layout for various blocks on a webpage.
Figure 2:
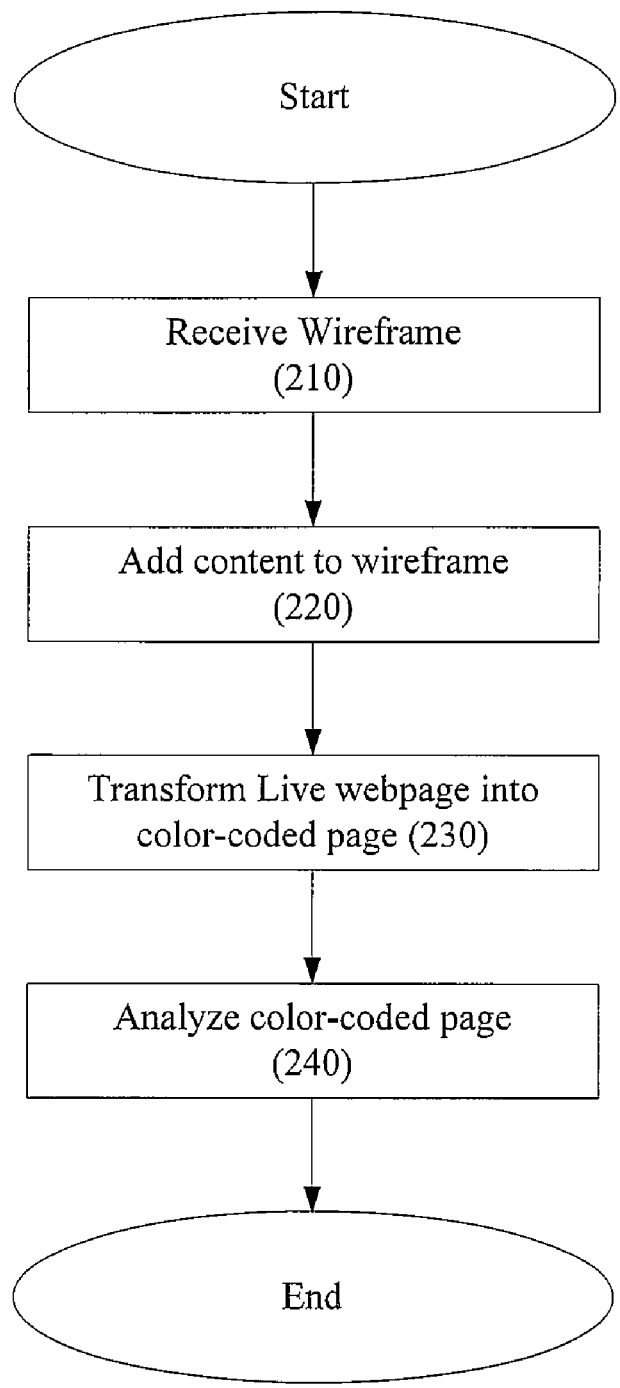
FIG. 2 shows a flowchart illustrating a method embodying techniques of the present invention.

Techniques of the present invention include an automated system for validating the layout of a webpage. FIG. 2 is a flow chart illustrating a method embodying such techniques. A site designer for a web domain can develop a wireframe that defines the layout for a series of webpages within the domain (210). The wireframe might, for example, define the structure and positioning of a series of XML or HTML blocks to which a web developer can add content in order to develop a series of live webpages (220). The type of content that a web developer might add is virtually limitless, and includes any type of modules such as the modules discussed in the example presented in FIG. 1. The content added to a block by a developer can influence the layout, such as the size and positioning, of that block when a live webpage is rendered by an internet browser. Additionally, the size and positioning of a first block might be dependent on the size and positioning, and hence the content, of a second block.

Figure 3A:
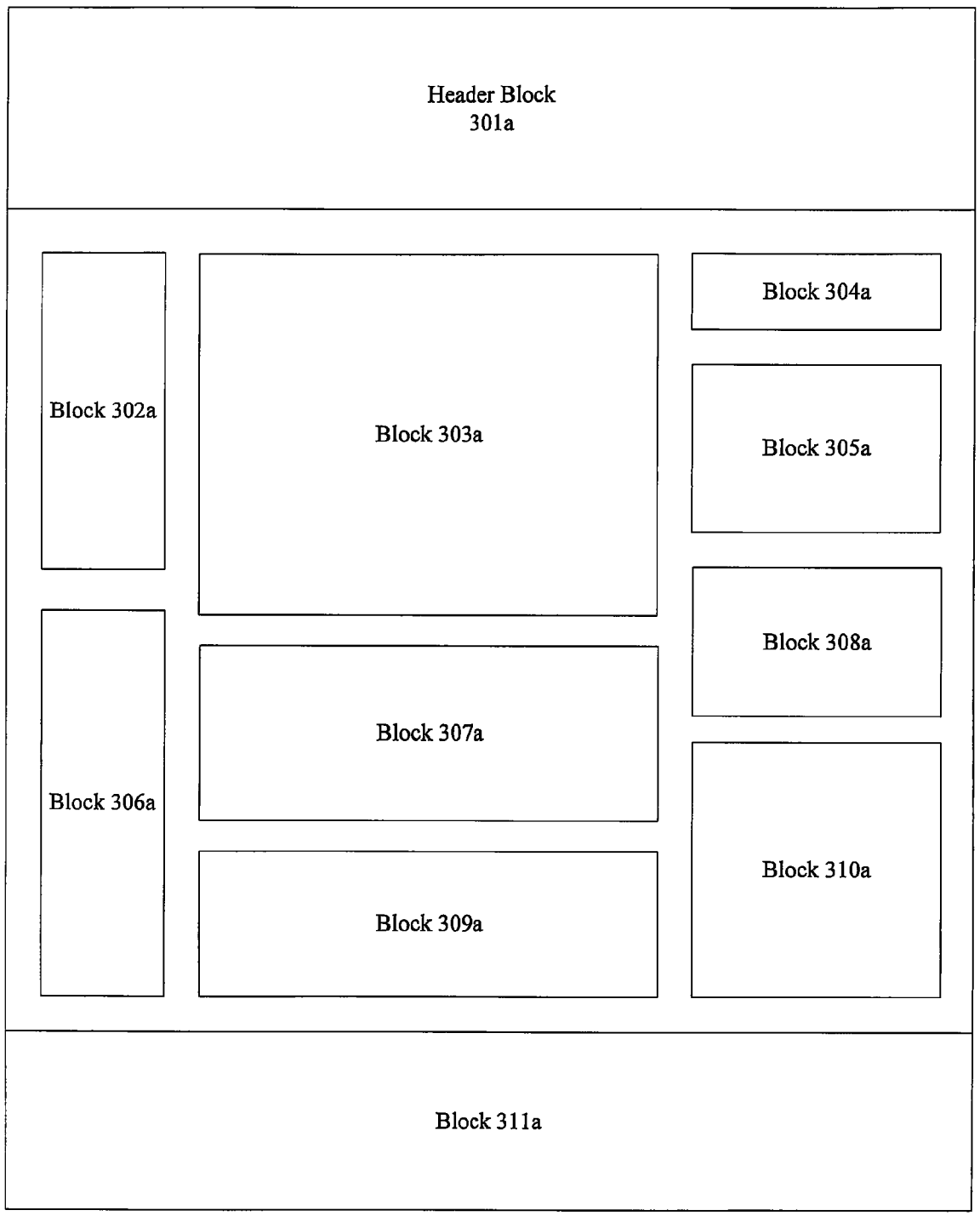
FIGS. 3a-c show examples color-coded pages with a plurality of blocks.

Using a color-adding code, a live webpage can be transformed into a color-coded page (230). The color-coded page can contain new blocks of the same size and position as the live webpage, but the new blocks can have different background colors. In some embodiments, the color-adding code might also hide the content of the blocks so that the new blocks on the color-coded page show only colors where the blocks of the live webpage are located. FIG. 3a shows an example of a color-coded page with a plurality of new blocks 301a-311a. In the color-coded page of FIG. 3a, each block could be a unique color and show no visible content. For example, block 301a could be red, block 302a could be blue, and so on. The color-coded page can then be analyzed to determine if the layout of the live webpage is correct (240).

Color-Adding Code

Techniques of the present invention include using color-adding code to transform a live webpage into a color-coded page. The color-adding code can be written in hypertext markup language (HTML), extensible markup language (XML), or any other language used to develop webpages.

Each block within a wireframe can be identified by a block identifier (ID). For example, in XML a first block might be identified using code that reads: <block id="Block1">. In HTML such code might appear as: <div id="Block1">. The color-adding code can be written such that it either looks for blocks with particular IDs or looks for blocks with any ID. Upon identifying blocks, the color-adding code can hide the content of the blocks and generate new blocks with different background colors.

An example of color-adding code for a Firefox® Greasemonkey® plug-in, with comments identified by the "//" symbol, might look as follows:

```
// Function to add the specified style for the given ID
function processId( id, color ) {
    var elem = document.getElementById( id );
    if( ! elem )
    return;
    // Compute the position and size of the new DIV block to be created
    // to hide the original block. The new block can be positioned at the
    // exact same location and can have the exact same size as the original
    block.
    var elemleft = elem.offsetLeft;
    var elemwidth = elem.offsetWidth;
    var elemtop = elem.offsetTop;
    var elemheight = elem.offsetHeight;
    var theOffsetParent = elem.offsetParent;
    var theParent = theOffsetParent.nodeName;
    while( theOffsetParent.nodeName != "BODY") {
        elemtop = theOffsetParent.offsetTop + elemtop;
        elemleft = theOffsetParent.offsetLeft + elemleft;
        theOffsetParent = theOffsetParent.offsetParent;
    }
    // Now that the position of the original block is known, the new block
    // can be created and positioned. The background color of the new
    // block can be set based on the value in the parameter.
    var newDiv=document.createElement("div");
    newDiv.style.backgroundColor = color;
    newDiv.style.position = 'absolute';
    newDiv.style.top = "" + elemtop + "px";
    newDiv.style.left = "" + elemleft + "px";
    newDiv.style.height = "" + elemheight + "px";
    newDiv.style.width = "" + elemwidth + "px";
    newDiv.style.zIndex = "100";
```

-continued

```
    var hiddingDiv = document.createTextNode( id );
    newDiv.appendChild( hiddingDiv );
    document.body.appendChild( newDiv );
}
// The array below contains the mapping between the DIV ID and the
// color. every DIV block with the id equal to the first value can be colored
// using the color specified in the second parameter.
var arrayIdsColors = new Array (
    [ "pa", "#FF0000" ],
    [ "masthead", "#222222" ],
    [ "trough", "#6A6A6A" ],
    [ "news", "#44FF11" ],
    [ "footer", "#181818" ],
    [ "adlrec", "#818181" ],
    [ "marketplace", "#A5A5A5" ],
    [ "eyebrow", "#4F4F9F" ],
    [ "smallbiz", "#BB3B3B" ],
    [ "advertising", "#BB3B00" ],
    [ "mantle", "#B00B31" ],
    [ "popsearch", "#B00BAA" ],
    [ "today", "#399A31" ]
);
for (var a = 0; a < arrayIdsColors.length; a++) {
    processId( arrayIdsColors[a][0], arrayIdsColors[a][1]);
}
```

The above code can identify blocks (such as "pa," "masthead," etc.), extract information relating to the size and location of the blocks, generate new blocks with the same size and location, and assign a color value (#FF0000, #222222, etc.) to each of the new blocks. The above code can further replace the original blocks with the new blocks such that the new blocks can hide any content of the original blocks. Hiding of the original blocks, identified as marketplace and news in the following example, can be accomplished by adding a set of lines, such as in the following example:

```
<div style="background-color: rgb(255, 102, 102); position: absolute; top:
173px; left: 735px; height: 118px; width: 350px; z-index:
100;">marketplace</div>
<div style="background-color: rgb(106, 106, 106); opacity: 0.6; position:
absolute; top: 173px; left: 135px; height: 497px; width: 150px; z-index:
100;">news</div>
```

The code of the example above is written to position a new block with the top left corner at a position of 173 pixels from the top and 735 pixels from the left and with a 118 pixel height and a 350 pixel width.

In one embodiment, the color-adding code can be executed by a web browser, such as Firefox®, that supports document object model modification, to generate color-coded pages in real time. The color-adding code provided above, might for example, be executed by a Mozilla Firefox® extension such as Greasemonkey® or Searchmonkey® that allows users to execute scripts making real-time changes to HTML-based webpages. In alternate embodiments the color-adding code might be executed by a web proxy such as Fiddler or Paros.

Multi-browser implementations can also be developed in Java to work with applications such as Selenium®. An example of color-adding Javascript code that follows the Selenium standard and can be used as a Selenium extension is provided below.

```
Selenium.prototype.doHighlightElement = function(id, color)
    var oElm = this.browserbot.findElement(id);
    oElm.style.opacity=.50;
```

-continued

```
    oElm.style.background=color;
    oElm.innerHTML="<div style=\"opacity: 0;filter: alpha(opacity =
0);\">"+oElm.innerHTML;
    oElm.innerHTML=oElm.innerHTML+"</div>";
  };
  Selenium.prototype.doHighlightParentElement = function(id, color) {
    var oElm = this.browserbot.findElement(id);
    oElm.style.opacity=.50;
    oElm.style.background=color;
    //oElm.innerHTML="<div style=\"opacity: 0; filter: alpha(opacity =
0);\">"+oElm.innerHTML;
    //oElm.innerHTML=oElm.innerHTML+"</div>";
  };
```

The above code identifies an HTML element represented by the parameter "id," hides the HTML element's content, and changes the HTML element's background color based on the parameter "color." The code further can change the color of an element within a parent element such that the resulting color of the element will be a combination of the color identified for the element and the color identified for the parent element.

Analyzing the Color-Coded Page

Figure 3B:
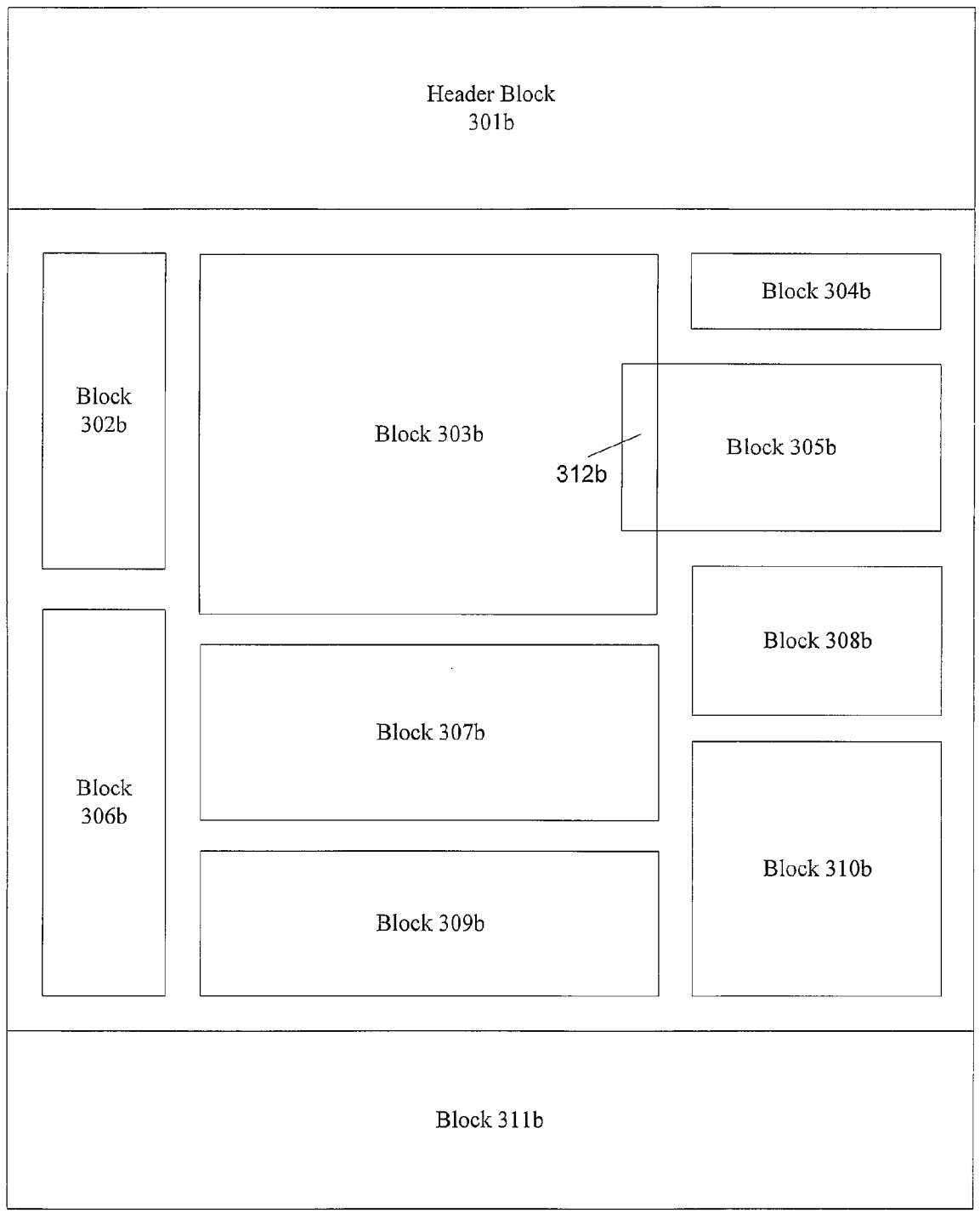

Techniques of the present invention include analyzing a color-coded page to determine if the layout of the corresponding live webpage is correct or is consistent with the expectations and desires of a web developer. Depending on implementation preferences, the color-coded page may be analyzed directly or an image snapshot, such as a bitmap image or portable network graphics (PNG) image, may be analyzed. In one embodiment, the color-coded page or snapshot image can be presented to a user, such as a web developer or quality assurance manager, to be visually inspected to determine if the layout of blocks of the corresponding live webpage is correct when rendered by a web browser. For example, an image such as FIG. 3b might be presented to a user, where the color of the blocks would make the overlap 312b of blocks 303b and 305b easily discernible. On the live webpage, however, the blocks corresponding to blocks 303b and 305b might have a common background color and no discernible borders, making detection of the overlap 312b difficult if not impossible.

Figure 3C:
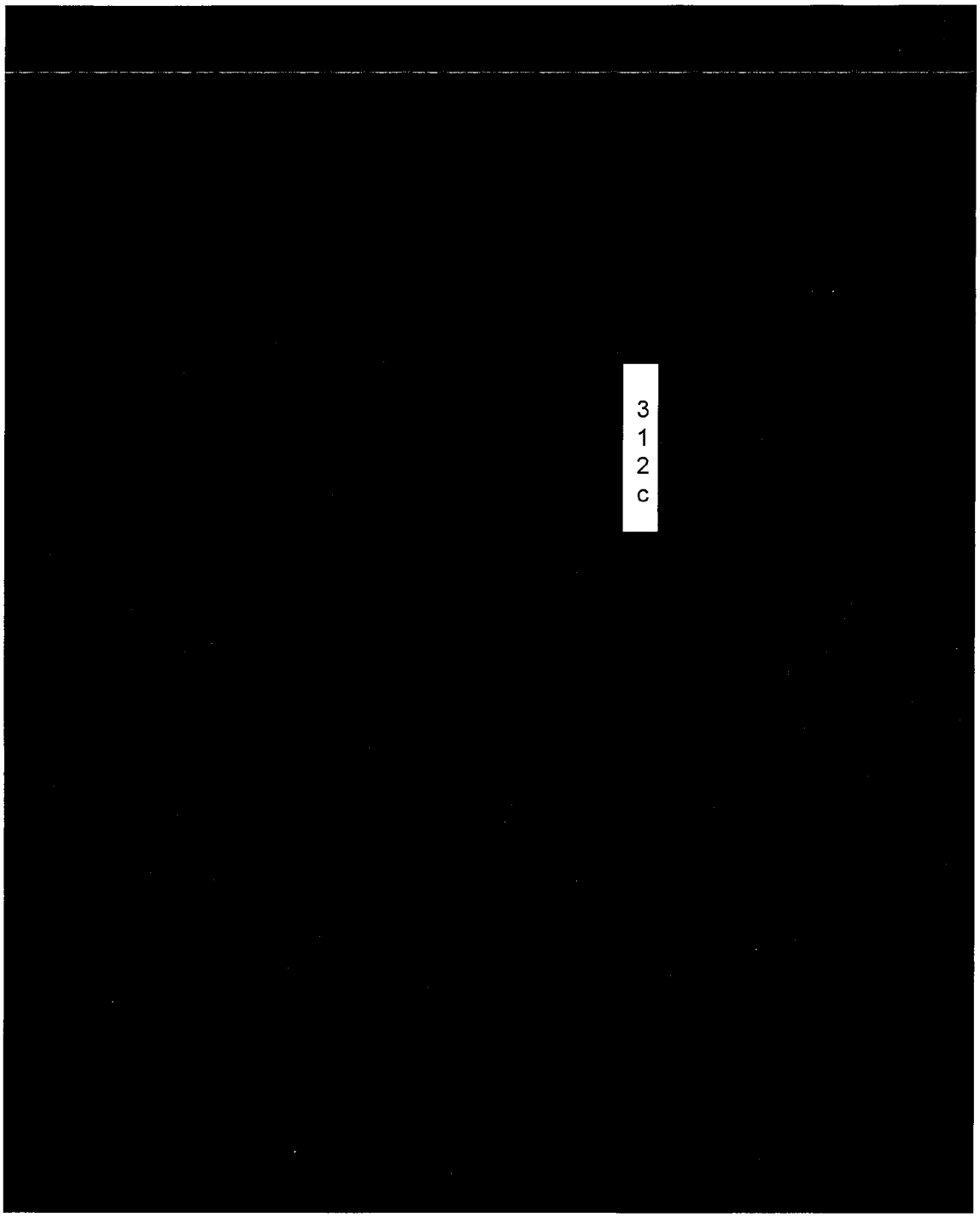

In alternate embodiments, the analysis of the color-coded page or snapshot can be automated by computer tools implementing one of the many digital image comparison algorithms known in the art. For example, an image of a color-coded page can be subtracted from a reference image to generate a result image. The subtraction can be done by subtracting a pixel value for each pixel on the image of the color-coded page from a corresponding pixel value of a pixel on the reference image. If two pixels have the same pixel value (i.e. the pixels are the same color), then the result of the subtraction will be zero. A pixel value of zero typically corresponds to black. If two corresponding pixels have different pixel values, then the result of the subtraction will be a value other than zero, which will correspond to a color other than black. Therefore, if the image of the color-coded page exactly matches the reference image, then the result image will be all black. If the image of the color-coded page has areas that are different than the reference image, then those areas will be a color other than black. For example, if the image of FIG. 3b was subtracted from a reference image that corresponded to FIG. 3a, it might create an image similar to FIG. 3c, where the only non-black portion 312c of the image is the portion of the image that corresponds to overlapping blocks. Areas with colors other than black can represent areas, where blocks on the live webpage overlap, areas that should not have blocks present that do, areas that should have blocks present that do not, or other errors in the layout of the live webpage. Although the present example uses black as the color that indicates a correct layout, it will be readily apparent to those skilled in the art that colors other than black could be used to represent a correct layout by altering the colors of the color-coded page, the reference image, or both.

The location of blocks on the color-coded page or snapshot can be compared to the location of blocks of the same color on a reference image, and a deviation between the color-coded page and the reference image of more than a certain amount can indicate an error in the layout of the live webpage. Additionally, the computer system can look for the absence of certain colors, indicating that a desired block is not present, or the presence of certain colors, indicating that blocks might be overlapping. The overlapping of blocks of first and second colors can form a third color, and detection of this third color can indicate an error in the layout of the corresponding live webpage. For example, on the image of FIG. 3b, the overlap 312b of blocks 303b and 305b could create the third color in the area where blocks 303b and 305b overlap. In alternate embodiments, blocks might be expected to overlap, and the absence of the third color might indicate an error in the layout of the corresponding live webpage.

In yet another embodiment, two color-coded pages might be compared to one another to assess the amount of difference between the pages. For example, a web developer might want to compare the British version of a webpage with the French version of a webpage to assess an extent of deviation between the two webpages.

In response to detecting an error in the layout of a live page, a system embodying aspects of the present invention can be configured to notify a user. Additionally, the system might be configured to provide the user with information, such as a block ID for a missing or overlapping block, that can be useful when trying to correct the code of the live webpage. In some embodiments of the invention, detection of an error might cause the system to take corrective action. For example, in response to determining that a first block overlaps with a second block, the system might automatically try reducing the font in one of the blocks, and after reducing the font, generating a new color-coded page to analyze. If the corrective action failed to correct the detected error, then the system might then notify a user.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
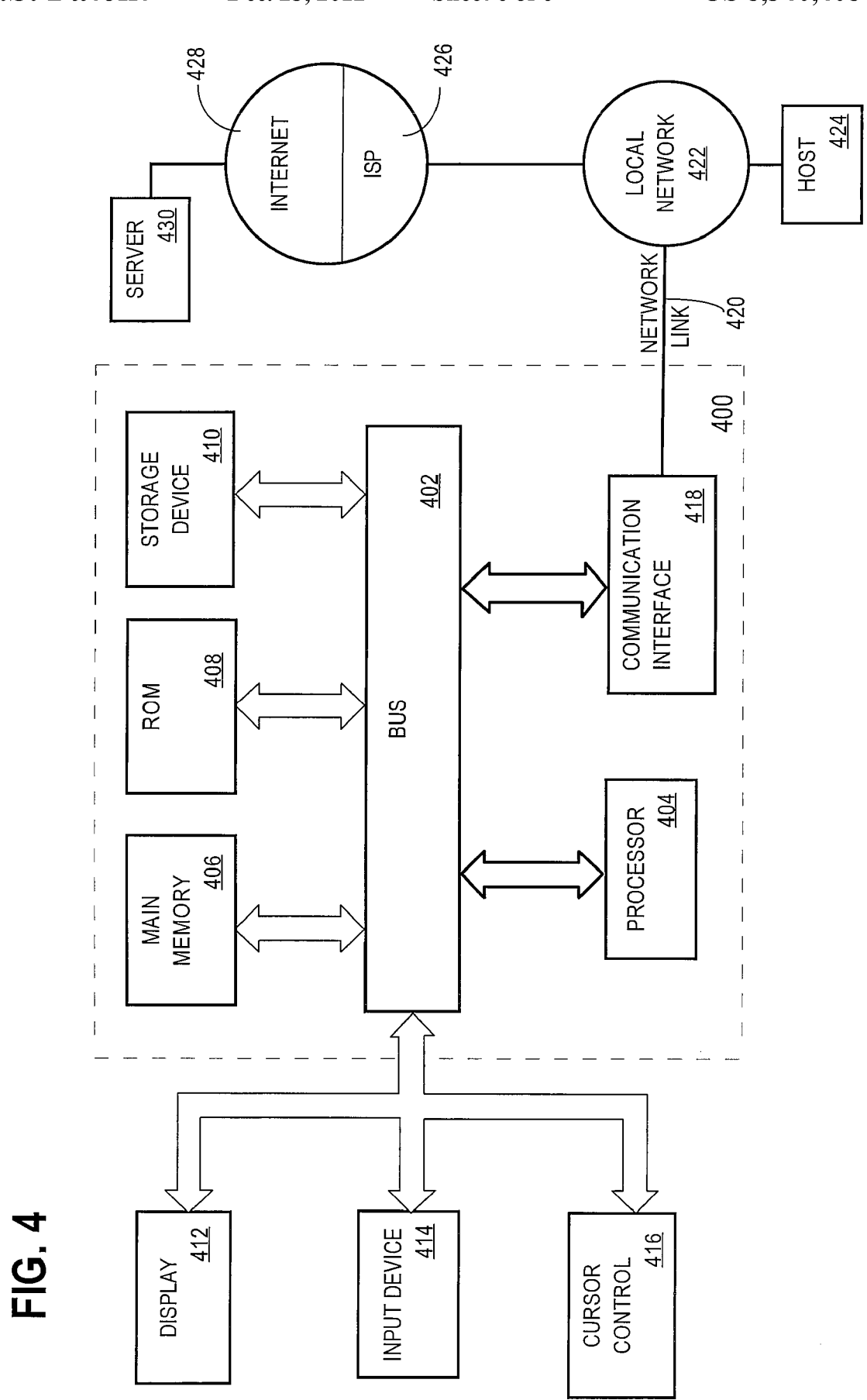
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Extensions and Alternatives

In this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving a webpage;
transforming the webpage into a color-coded page;
determining, based at least in part on a color added to the color-coded page during the transforming, that a layout of the webpage contains an error;
wherein the step of transforming is performed by one or more computing devices.

2. The method of claim 1, wherein the webpage comprises a first set of blocks and the color-coded page comprises a second set of blocks, and each block from the first set of blocks has a corresponding block of a same size and a same location in the second set of blocks.

3. The method of claim 2, wherein the step of determining comprises:
identifying a first block from the second set of blocks that overlaps with a second block from the second set of blocks.

4. The method of claim 1, wherein the step of transforming comprises:
identifying a block of content in the webpage;
identifying a size and a location of the block
creating a new block with the size and the location of the block;
assigning a new color to the new block.

5. The method of claim 1, wherein the step of determining comprises:
storing an image snapshot of the color-coded page;
comparing the image snapshot to a reference image.

6. The method of claim 5, wherein the step of comparing comprises:
determining an amount of difference between the image snapshot and the reference image.

7. The method of claim 5, wherein the step of comparing comprises:
subtracting a first pixel value of a pixel in the image snapshot from a second pixel value of a corresponding pixel in the reference image to determine a difference value;
detecting an error in the layout of the webpage based at least in part on the difference value.

8. The method of claim 1, wherein the step of determining comprises:
detecting a color on the color-coded page, the color to be indicative of an error in the layout of the live webpage.

9. The method of claim 1, wherein the step of determining comprises:
detecting a color on the color-coded page, the color to be indicative of a correct layout of the live webpage.

10. One or more non-transitory machine-readable storage media storing instructions which, when executed by one or more hardware processors, cause performance of the following steps:
receiving a webpage;
transforming the webpage into a color-coded page;
determining, based at least in part on a color added to the color-coded page during the transforming, that a layout of the webpage contains an error;
wherein the step of transforming is performed by one or more computing devices.

11. The media of claim 10, wherein the webpage comprises a first set of blocks and the color-coded page comprises a second set of blocks, and each block from the first set of blocks has a corresponding block of a same size and a same location in the second set of blocks.

12. The media of claim 11, wherein the instructions which, when executed by one or more hardware processors, further cause performance of the following step:
identifying a first block from the second set of blocks that overlaps with a second block from the second set of blocks.

13. The media of claim 10, wherein the instructions which, when executed by one or more hardware processors, further cause performance of the following steps:
identifying a block of content in the webpage;
identifying a size and a location of the block
creating a new block with the size and the location of the block;
assigning a new color to the new block.

14. The media of claim 10, wherein the instructions which, when executed by one or more hardware processors, further cause performance of the following steps:
storing an image snapshot of the color-coded page;
comparing the image snapshot to a reference image.

15. The media of claim 14, wherein the instructions which, when executed by one or more hardware processors, further cause performance of the following step:
determining an amount of difference between the image snapshot and the reference image.

16. The media of claim 14, wherein the instructions which, when executed by one or more hardware processors, further cause performance of the following steps:
subtracting a first pixel value of a pixel in the image snapshot from a second pixel value of a corresponding pixel in the reference image to determine a difference value;
detecting an error in the layout of the webpage based at least in part on the difference value.

17. The media of claim 10, wherein the instructions which, when executed by one or more hardware processors, further cause performance of the following step:
detecting a color on the color-coded page, the color to be indicative of an error in the layout of the live webpage.

18. The media of claim 10, wherein the instructions which, when executed by one or more hardware processors, further cause performance of the following step:
detecting a color on the color-coded page, the color to be indicative of a correct layout of the live webpage.

* * * * *